(12) United States Patent
Ouderkirk et al.

(10) Patent No.: US 10,698,483 B1
(45) Date of Patent: Jun. 30, 2020

(54) EYE-TRACKING SYSTEMS, HEAD-MOUNTED DISPLAYS INCLUDING THE SAME, AND RELATED METHODS

(71) Applicant: Facebook Technologies, LLC, Menlo Park, CA (US)

(72) Inventors: Andrew John Ouderkirk, Redmond, WA (US); Barry David Silverstein, Kirkland, WA (US); Brian Wheelwright, Sammamish, WA (US); Robin Sharma, Redmond, WA (US); Spencer Allan Wells, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/390,630

(22) Filed: Apr. 22, 2019

(51) Int. Cl.
| | | |
|---|---|---|
| *G06F 3/01* | (2006.01) | |
| *G02B 27/01* | (2006.01) | |
| *G02B 27/00* | (2006.01) | |

(52) U.S. Cl.
CPC ......... *G06F 3/013* (2013.01); *G02B 27/0093* (2013.01); *G02B 27/0172* (2013.01); *G06F 3/017* (2013.01)

(58) Field of Classification Search
CPC ..... G06F 3/013; G06F 3/017; G02B 27/0093; G02B 27/0172
See application file for complete search history.

(56) References Cited

U.S. PATENT DOCUMENTS

| | | | | |
|---|---|---|---|---|
| 9,345,402 | B2* | 5/2016 | Gao | A61B 3/113 |
| 2006/0209013 | A1* | 9/2006 | Fengels | G06F 3/0325 |
| | | | | 345/156 |
| 2012/0249797 | A1* | 10/2012 | Haddick | G06F 3/016 |
| | | | | 348/158 |
| 2013/0169683 | A1* | 7/2013 | Perez | G06K 9/46 |
| | | | | 345/633 |
| 2013/0321462 | A1* | 12/2013 | Salter | G06F 1/163 |
| | | | | 345/633 |
| 2014/0049452 | A1* | 2/2014 | Maltz | G06F 3/013 |
| | | | | 345/8 |
| 2018/0227470 | A1* | 8/2018 | Ronngren | G06F 1/163 |
| 2018/0287700 | A1* | 10/2018 | Gummadi | H04B 10/116 |
| 2019/0369836 | A1* | 12/2019 | Faulkner | G06F 3/013 |
| 2019/0384378 | A1* | 12/2019 | Ebert | G02B 27/0176 |

OTHER PUBLICATIONS

Golard et al., "Systems and Methods for Using Eye Tracking to Improve User Interactions With Objects in Artificial Reality", U.S. Appl. No. 16/354,835 dated Mar. 15, 2019, 80 pages.

* cited by examiner

*Primary Examiner* — Shen Shiau
(74) *Attorney, Agent, or Firm* — FisherBroyles, LLP

(57) ABSTRACT

Eye-tracking systems of the present disclosure may include at least one light source configured to emit radiation toward a location intended for an eye of a user and at least one optical sensor comprising at least one sensing element configured to detect at least a portion of the radiation emitted by the at least one light source. The at least one sensing element may have a lateral width of at least about 5 μm and a lateral length of at least about 5 μm. The eye-tracking system may be configured to track the user's eye using data generated by at least the optical sensor. Various other methods, systems, and devices are also disclosed.

20 Claims, 9 Drawing Sheets

EYE-TRACKING SYSTEMS, HEAD-MOUNTED DISPLAYS INCLUDING THE SAME, AND RELATED METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
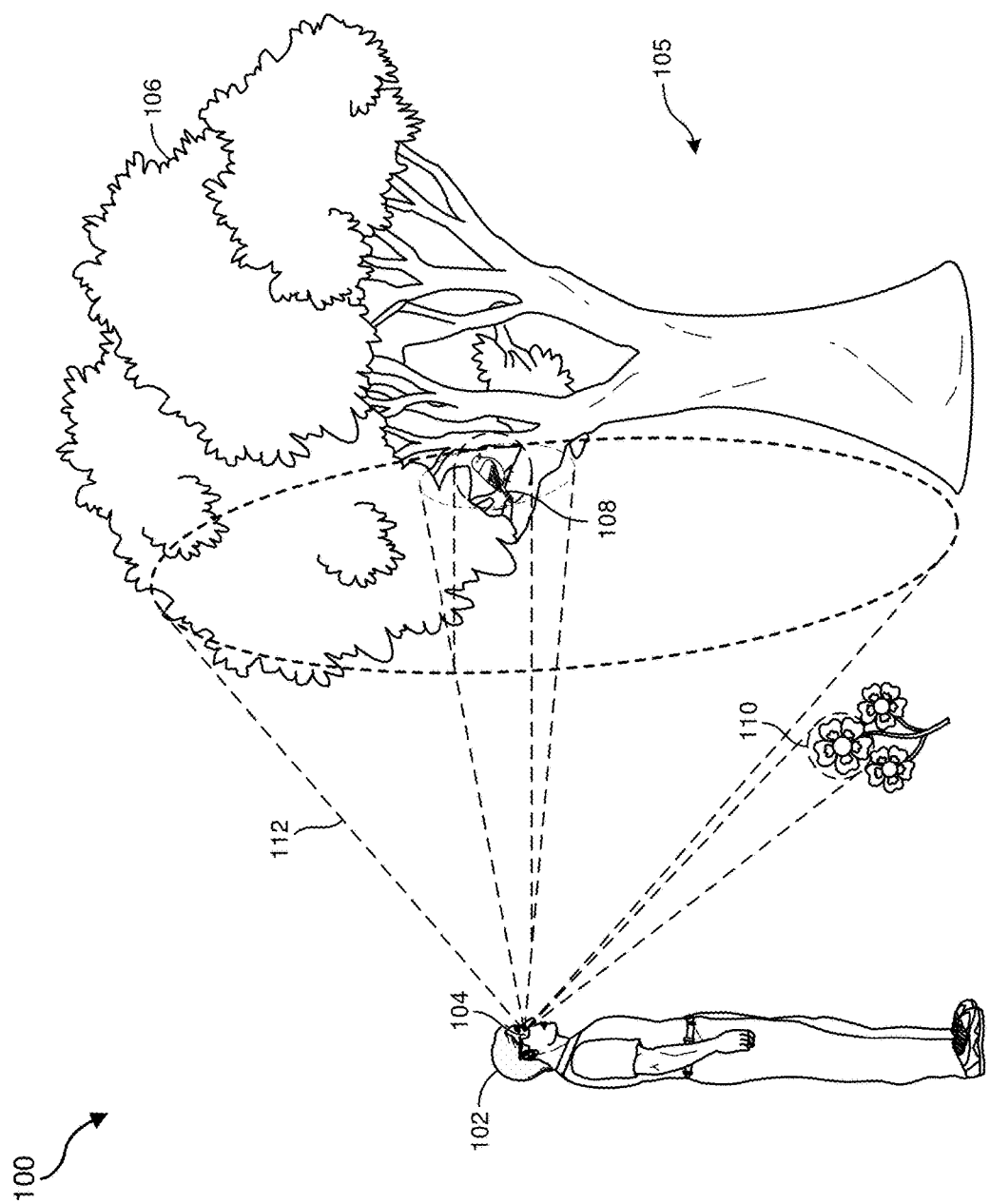
FIG. 1 is an illustration of an example environmental context in which an eye-tracking system may be used, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems (e.g., virtual-reality systems, augmented-reality systems, mixed-reality systems, and hybrid-reality systems) typically include a display element configured to present images of real and/or virtual scenes and objects to users. Some artificial-reality systems also include an eye-tracking subsystem designed to track a user's eye to determine where the user is looking. Unfortunately, conventional eye-tracking subsystems often generate an excessive amount of data per time unit, typically due to their reliance on relatively high frame rate and/or high-resolution sensors. This may, in turn, result in increased computational latency and bottlenecks, which may degrade the overall user experience.

For example, conventional eye-tracking systems often use relatively high-resolution cameras to track a user's eye. These cameras typically include arrays of optical sensing elements with relatively high pixel counts (e.g., kilopixel or megapixel arrays), which may require relatively high bandwidth backend processing. For example, such conventional eye-tracking systems may generate and process megabits of data per second due to their reliance on relatively high frame rate and/or high-resolution sensors. Generating and/or processing megabits of data per second may require significant computational capabilities (e.g., fast processors, an increased memory footprint, high power, etc.) and/or an increased physical footprint to house larger sensor arrays and associated backend electronics. Moreover, conventional eye-tracking systems like these may be prone to higher risks of malfunction (e.g., memory faults, operating system or application crashes, etc.) as a result of the higher computational load and complexity.

The present disclosure is generally directed to eye-tracking systems, head-mounted displays (HMDs) including eye-tracking devices, and related methods that may be employed to effectively track a user's eye while reducing the amount of data generated and improving efficiency compared to conventional devices, systems, and methods for eye tracking. In some examples, this disclosure describes eye-tracking devices and systems that include one or more optical sensors having a relatively low number of relatively low-resolution sensing elements. Thus, the eye-tracking devices and systems may, in some embodiments, be capable of fast and reliable processing of data sufficient for accurate eye tracking.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
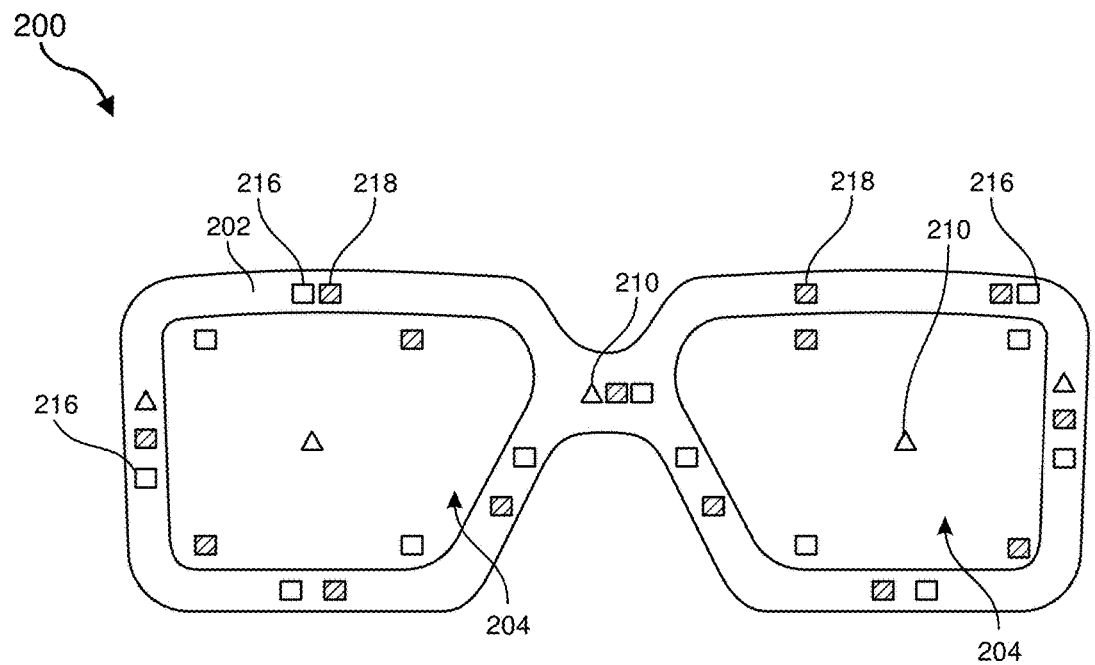
FIG. 2 is a schematic back (i.e., user's) view of an example head-mounted display ("HMD") including an eye-tracking system according to at least one embodiment of the present disclosure.
Figure 3:
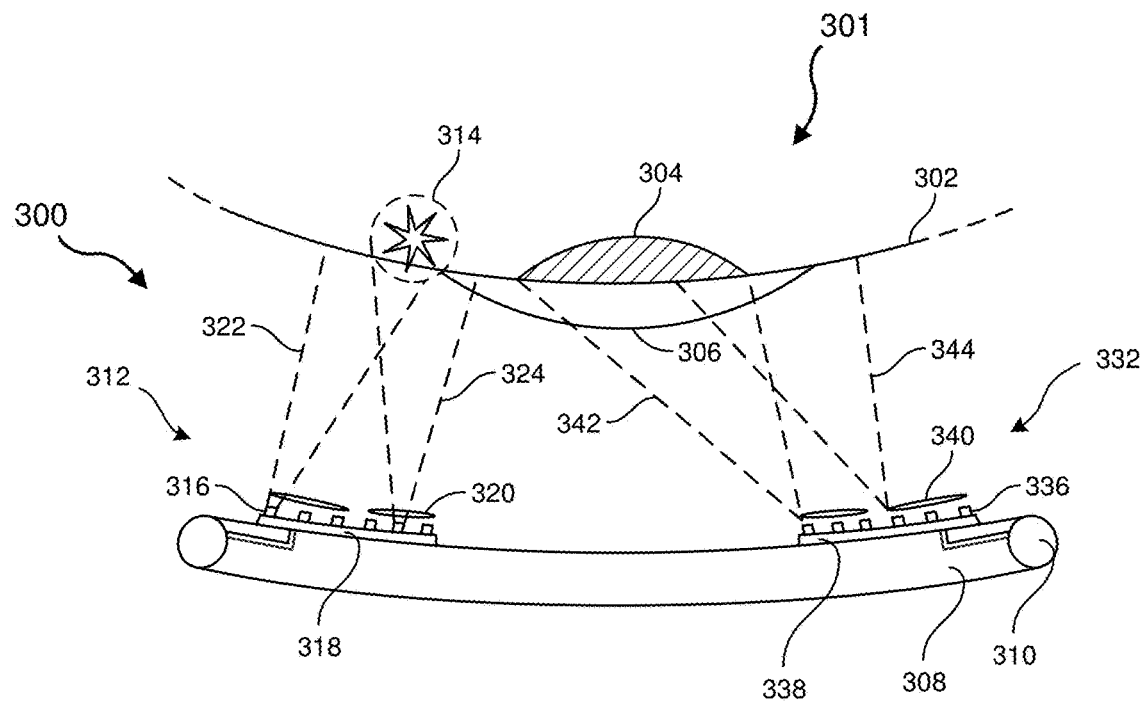
FIG. 3 is a top view of an eye-tracking system positioned with respect to a user's eye, according to at least one embodiment of the present disclosure.
Figure 4A:
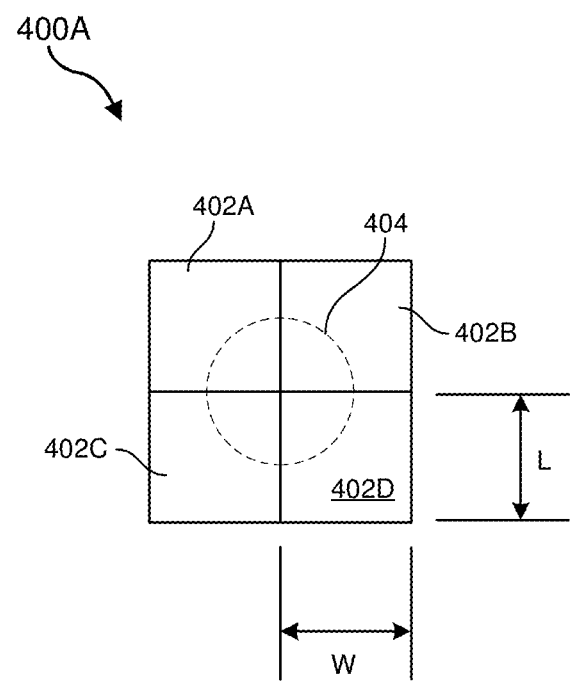
FIGS. 4A and 4B are plan views of respective optical sensors including sensing elements, according to at least some embodiment of the present disclosure.
Figure 4B:
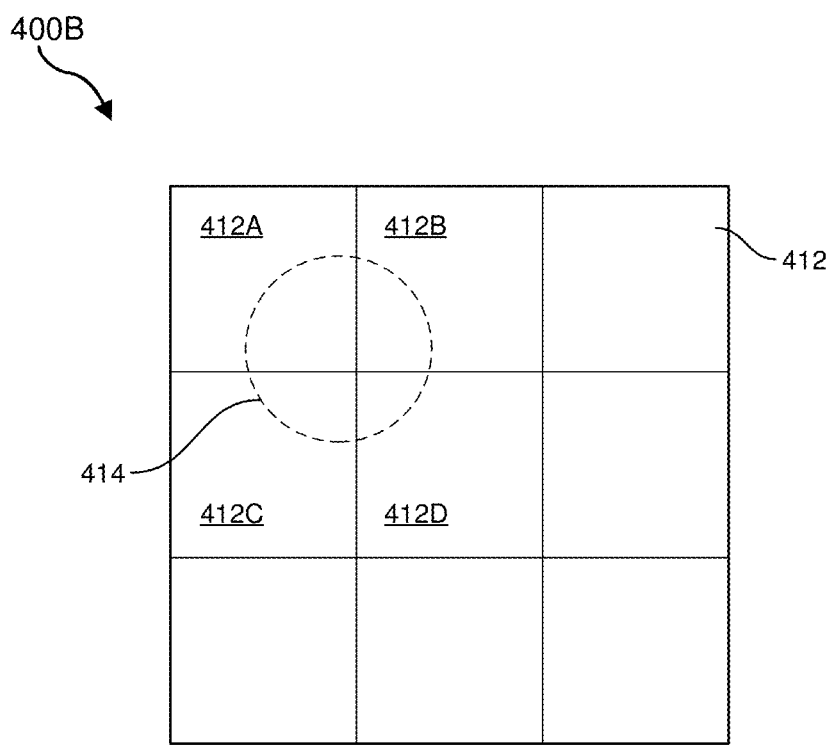
Figure 5:
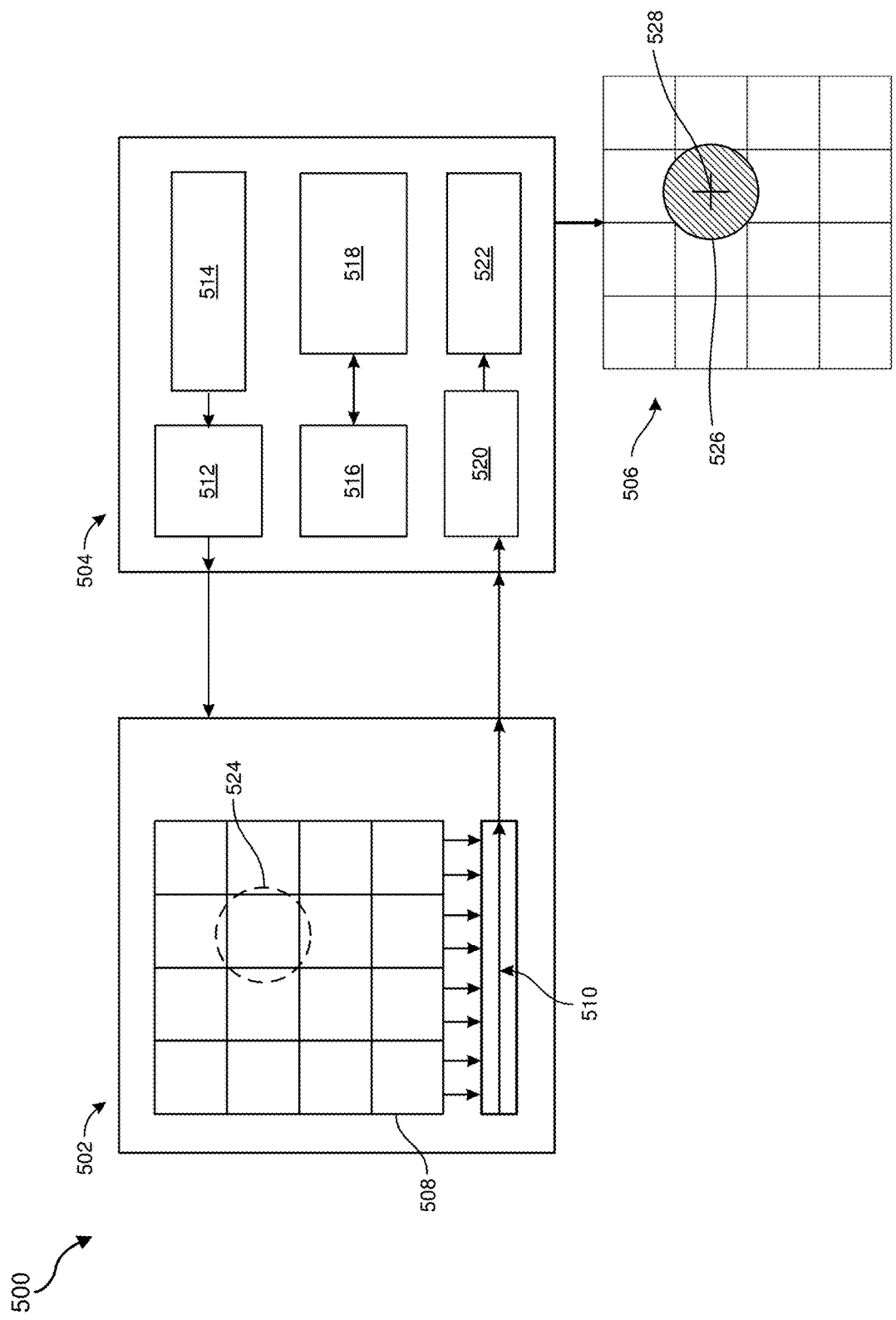
FIG. 5 is a schematic illustration of an optical eye-tracking system, according to at least one embodiment of the present disclosure.
Figure 6A:
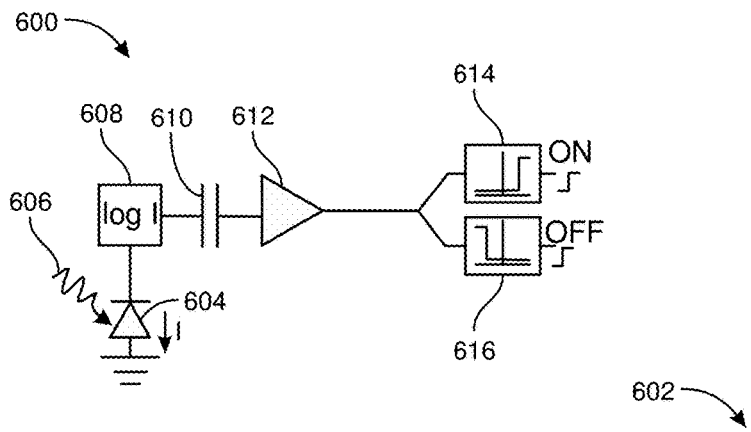
FIG. 6A is a schematic illustration of an optical sensing system, according to at least one embodiment of the present disclosure.
Figure 6B:
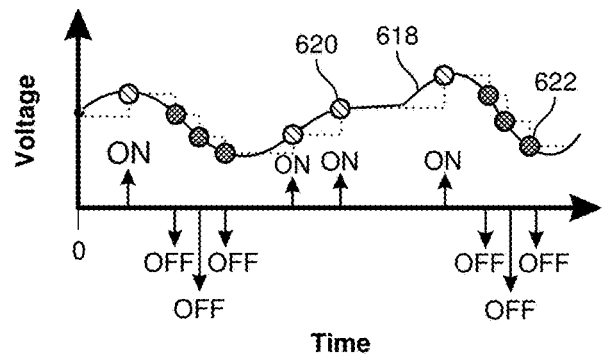
FIG. 6B is a plot showing an example voltage output of the optical sensing system of FIG. 6A over time, according to at least one embodiment of the present disclosure.
Figure 7:
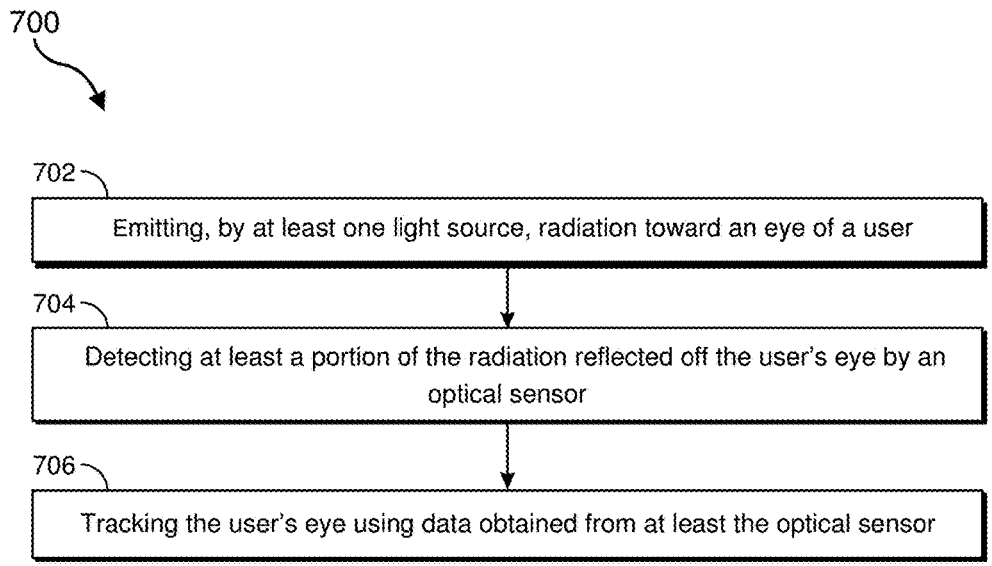
FIG. 7 is flow diagram of a method for eye tracking, according to at least one embodiment of the present disclosure.
Figure 8:
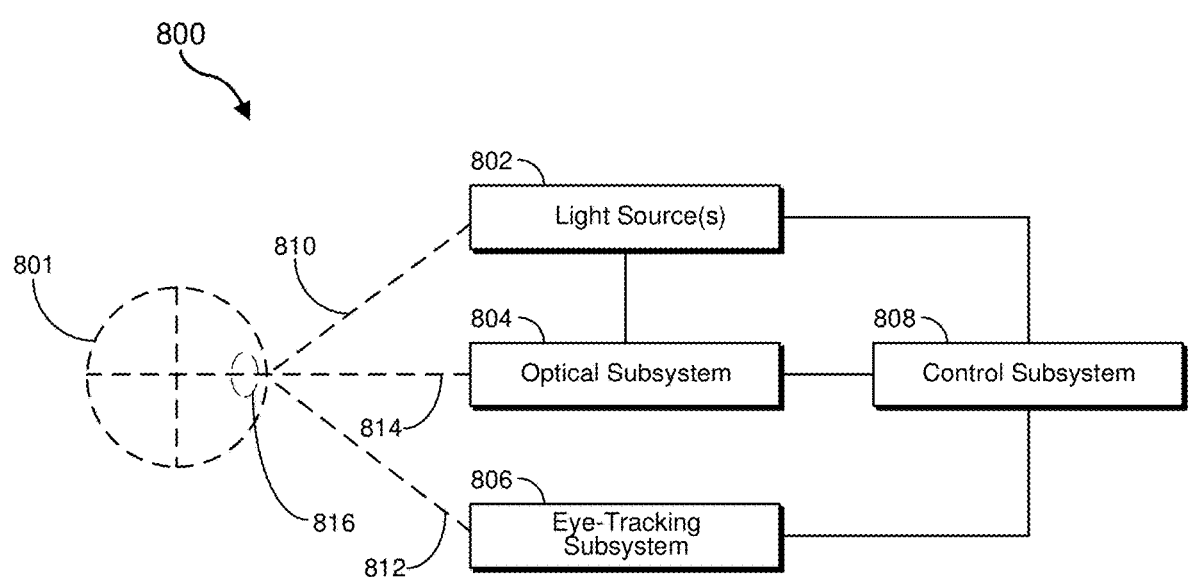
FIG. 8 is schematic illustration of a display system, according to at least one embodiment of the present disclosure.
Figure 9:
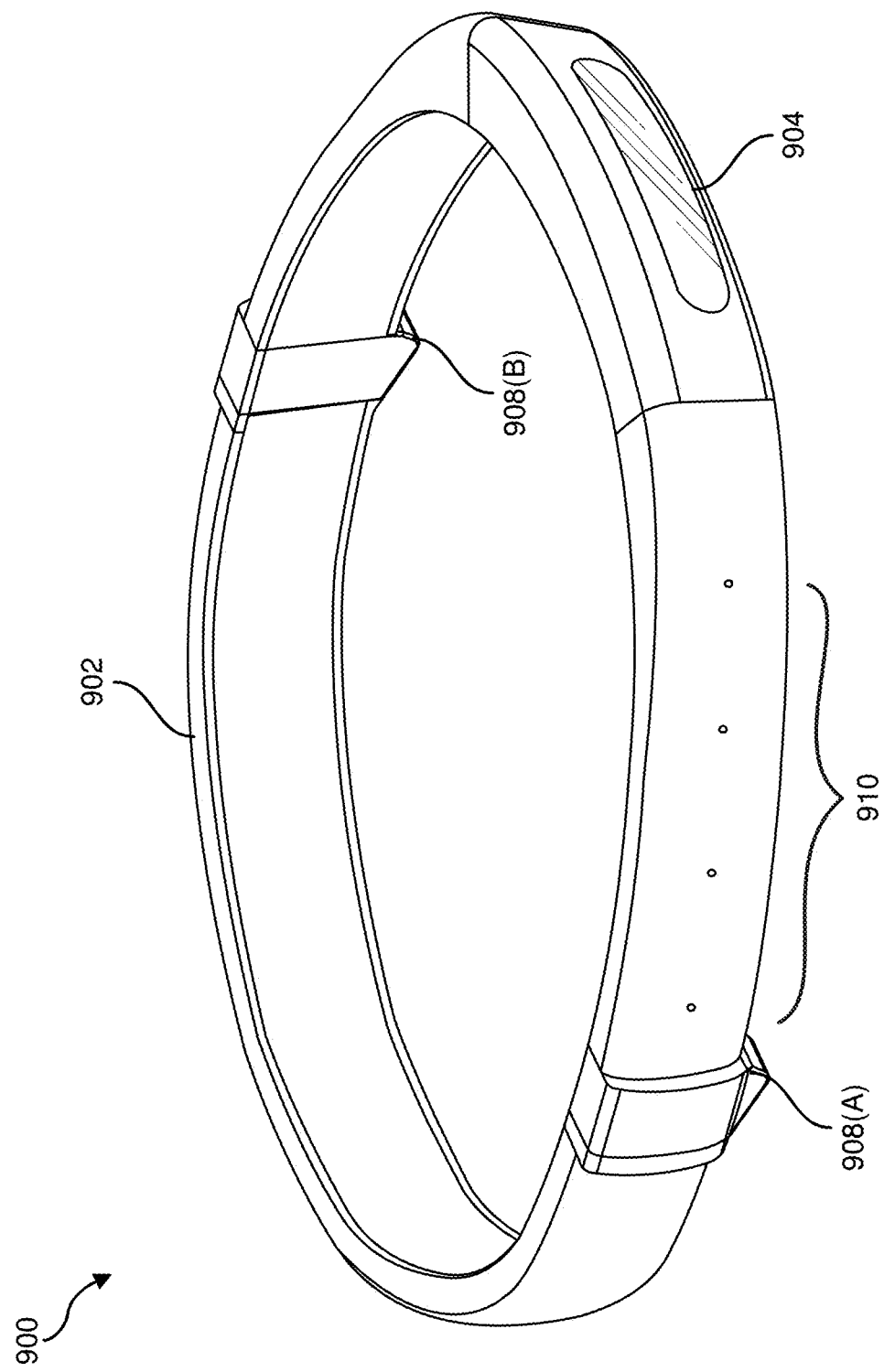
FIG. 9 is an illustration of an example artificial-reality headband that may be used in connection with embodiments of this disclosure.
Figure 10:
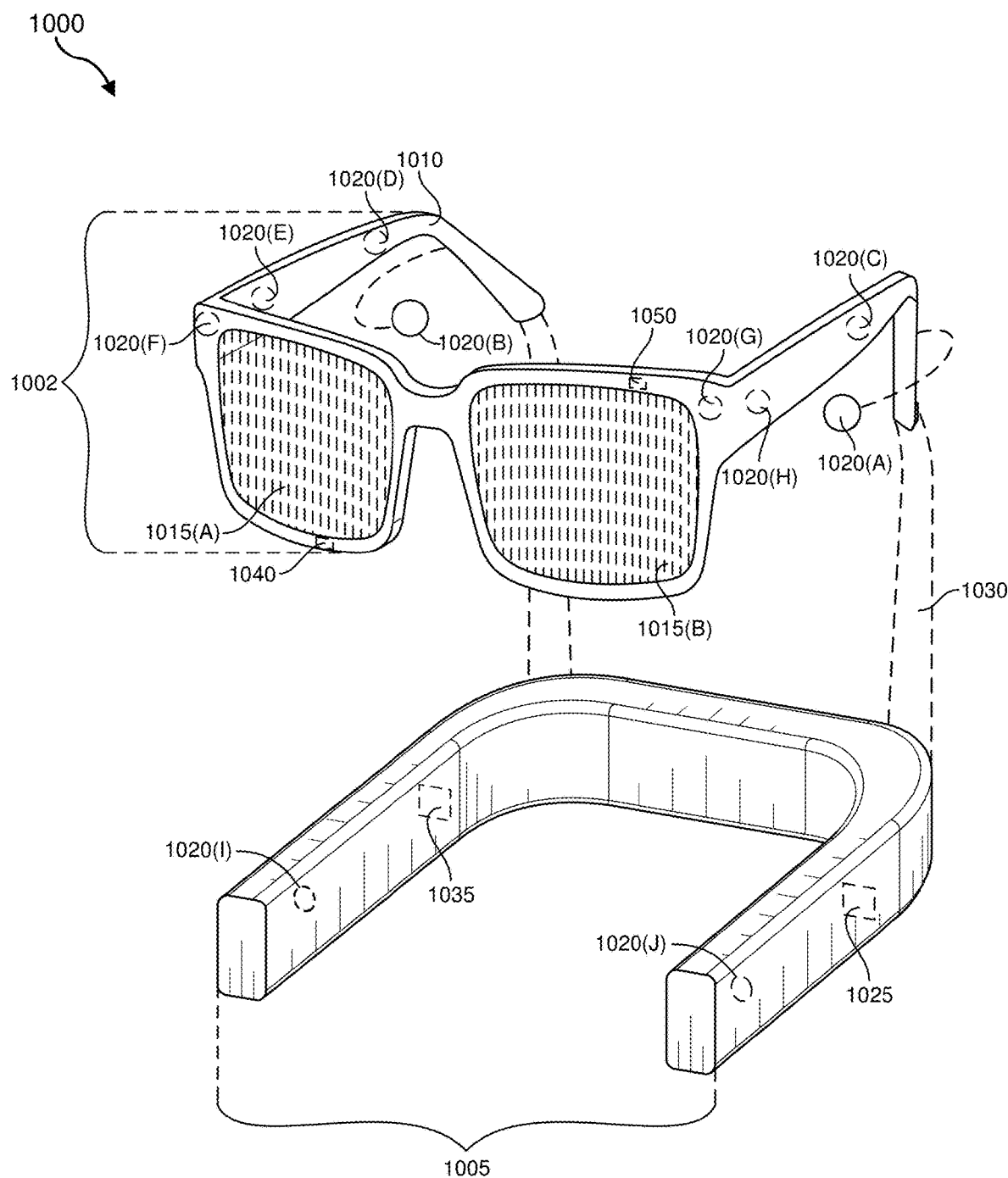
FIG. 10 is an illustration of example augmented-reality glasses that may be used in connection with embodiments of this disclosure.
Figure 11:
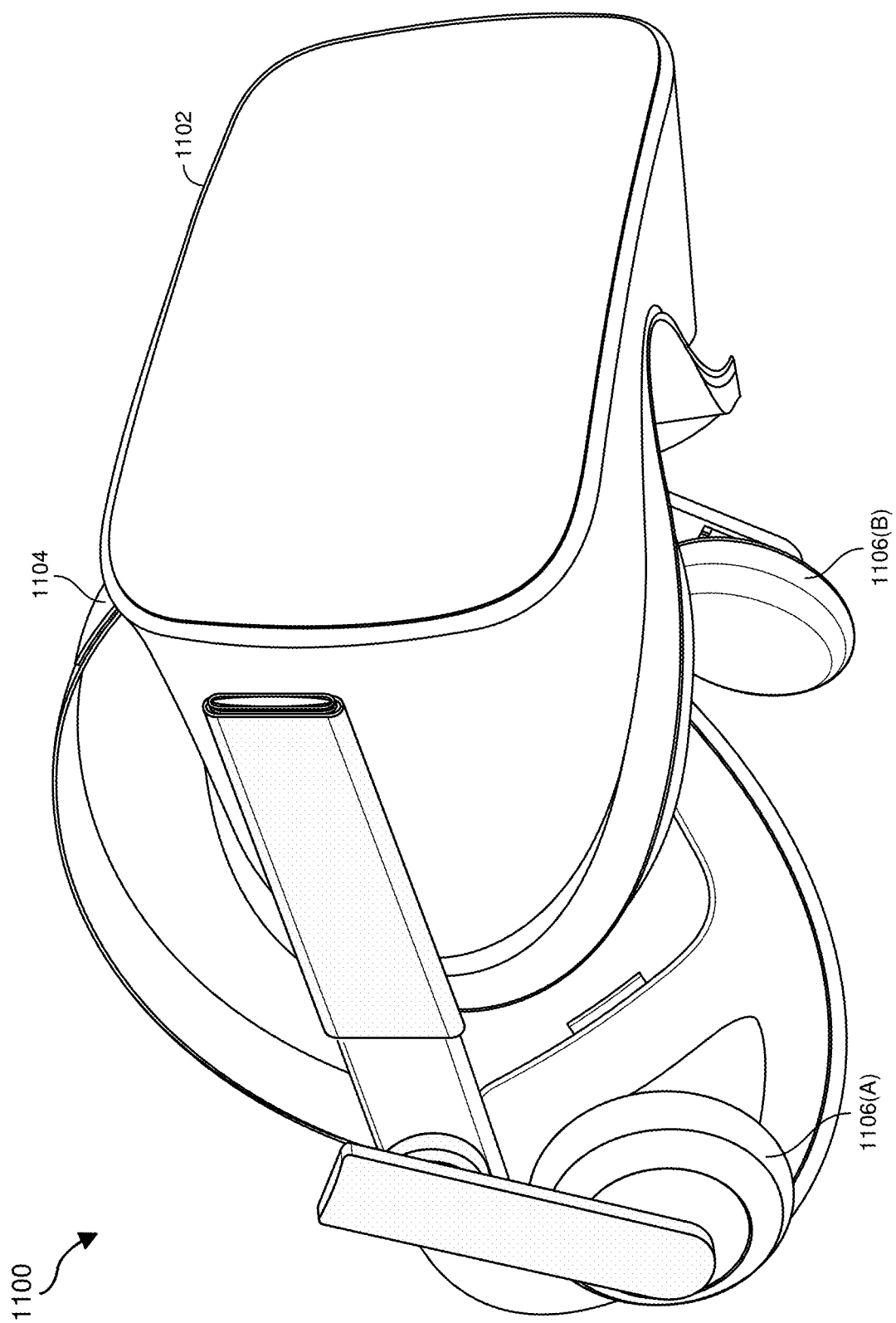
FIG. 11 is an illustration of an example virtual-reality headset that may be used in connection with embodiments of this disclosure.

The following will provide, with reference to FIG. 1, detailed descriptions of an example environmental context in which eye-tracking systems of the present disclosure may be used. With reference to FIGS. 2 and 3 the following will provide detailed descriptions of example eye-tracking systems. With reference to FIGS. 4A and 4B, the following will provide detailed descriptions of example optical sensors. With reference to FIG. 5, detailed descriptions of another example eye-tracking system will be provided. With reference to FIGS. 6A and 6B, the following will provide detailed descriptions of an example optical sensing system and its voltage output over time, respectively. With reference to FIG. 7, the following will provide detailed descriptions of an example method for eye tracking. With reference to FIG. 8, detailed descriptions of an example display system will be provided. With reference to FIGS. 9-11, the following will provide detailed descriptions of various example artificial-reality systems that may be used in connection with embodiments of this disclosure.

FIG. 1 shows an example environmental context 100 in which eye-tracking systems of the present disclosure may be used. A user 102 may view a scene through or in an HMD 104, which may include an eye-tracking system. The eye-tracking system of the HMD 104 may include at least one optical sensor (e.g., one or more optical sensor arrays or optical sensors including a single photosensitive sensing element) positioned thereon including at least one sensing element for sensing a position of the user's 102 eye or eyes, as described in further detail below. In some examples, the optical sensor may be relatively low-resolution by employing a low number of (e.g., about 100 or fewer) sensing elements, each of which may have a lateral length of at least about 5 μm and a lateral width of at least about 5 μm.

The HMD 104 may be or include an artificial-reality system, such as a virtual-reality system or an augmented-reality system. For example, the user 102 may view a scene through an optical element (e.g., a lens, a combiner lens, a waveguide, a hot mirror, etc.) of the HMD 104. The scene may include real-world and/or virtual objects 105 (e.g., a real or virtual tree 106, a real or virtual bird 108, a real or virtual flower 110, etc.). The objects 105 may be at different locations in the user's 102 field of view and/or at different distances or perceived distances relative to the user 102.

The eye-tracking system of the HMD 104 may be used to analyze and determine the eye position, movement, and/or gaze of the user 102, such as when the user 102 shifts between different views of the objects 105 (e.g., the tree 106, the bird 108, and the flower 110) viewed through or in the HMD 104. Data relating to the user's 102 eye position and/or gaze may be used to perform a variety of tasks, such as to ascertain which object 105 is being viewed by the user 102 at a given time, to adjust an optical property (e.g., focal length) of the HMD 104, to adjust a blur or defocus of a virtual image displayed on the HMD 104, to alter a shape of a virtual image displayed on the HMD 104, to shift a position of a virtual image displayed by the HMD 104, to enable the user 102 to make a selection of a viewed object 105, to provide different virtual content (e.g., visual, auditory, haptic, etc.) and information to the user 102 depending on where the user 102 looks, to calibrate the HMD 104 and/or the eye-tracking system thereof, etc.

In the case of calibration, a supervised technique may involve the user 102 being directed to gaze at one or more of the objects 105 at a known time and/or in a known pattern, and the eye-tracking system of the HMD 104 may record values that correspond to the user's eye position and gaze data. Unsupervised techniques may involve predicting or analyzing where the user 102 is looking without being directed to look in a particular direction or at a particular object 105. In some examples, a combination of lookup table "LUT" techniques, shallow-learning calibration techniques and/or deep-learning techniques, such as supervised, unsupervised, semi-supervised, and/or reinforced learning techniques, may be used for calibrating the eye-tracking system of the HMD 104. In some embodiments, the calibration may employ a low-resolution optical sensor array and/or a higher-resolution optical sensor array to determine the eye position and gaze of the user 102. For example, a higher-resolution optical sensor array (e.g., a kilo-pixel or mega-pixel array) may be used to provide calibration for tracking of at least one eye. In some embodiments, the higher-resolution optical sensor array may be used for calibration at a relatively lower frame rate to provide absolute position information for the at least one eye, and the low-resolution optical sensor array may be used at a relatively higher frame rate (e.g., relative to the frame rate of the higher-resolution optical sensor array) to determine relative changes in eye position.

In some examples, the disclosed systems may use eye tracking to first identify the user's 102 field of view 112 and/or the eye gaze of the user 102 (i.e., the location within a scene on which the eyes of the user 102 are focused). The disclosed systems may then identify (using, e.g., machine-learning or computer-vision algorithms) an object 105 in the field of view 112 and/or an object 105 on which the user's 102 gaze is focused (such as the tree 106, the bird 108, or the flower 110).

The disclosed systems may track the eye(s) of the user 102 (and thus determine the eye gaze and/or field of view 112 of the user 102) using any of a variety of eye-tracking systems and techniques. In one example, the disclosed systems may track the eye(s) by tracking the movement of the user's 102 pupil and/or using so-called glints (also known as corneal reflections or Purkinje images) reflected from the eye. Additional discussions regarding eye-tracking systems and techniques are provided below, such as in connection with FIGS. 2-8.

The systems described herein may identify the objects 105 in a user's 102 field of view 112 and/or an object 105 on which the user's 102 gaze is focused in a variety of ways. In one embodiment, the disclosed systems may first analyze a scene (such as the environmental context 100 in FIG. 1) using an object-recognition algorithm (e.g., using a machine-vision algorithm), which may allow for the scene to be mapped into a number of objects that may be analyzed computationally by a processor of a device. This scene may be pre-mapped or may be mapped in real time or near real time. In one example, the scene may include information derived from an indoor map or from an outdoor map and/or may include information based on global-positioning system (GPS) signals or similar locational signals.

The eye-tracking system of the HMD 104 may exhibit characteristics to ensure that an optical sensor thereof meets a predetermined information output constraint, such as bandwidth, output speed, power level, accuracy, a combination thereof, or the like. For example, an optical sensor for eye tracking may exhibit a low resolution compared to conventional optical sensor arrays used for eye tracking. Thus, the optical sensors according to the present disclosure may produce data at a rate below a predetermined threshold, which may result in efficient (e.g., energy efficient, bandwidth efficient, etc.) eye tracking. Non-limiting examples of such characteristics of a given optical sensor may include a sensing element size, a number of sensing elements, an overall spatial resolution of the optical sensor, an angular position of the optical sensor with respect to a user's eye, a frequency range of detection for the sensing elements, response times of the sensing elements, combinations thereof, and/or the like.

The HMD 104 may include a processor and/or a memory configured to perform eye tracking locally on the HMD 104. Alternatively or additionally, the processor and/or memory may be coupled to a transceiver, which may be part of the HMD 104. The transceiver may be used to perform eye tracking at least partially on an external device. The external device may include a third-party server, a cloud-based server, a user device such as a mobile device, a tablet, a computer, combinations thereof, and/or the like.

FIG. 2 is a schematic back (i.e., user's) view of an example HMD 200 including an eye-tracking system. The HMD 200 may include a frame 202 that supports one or more optical elements 204 (e.g., an optical lens, a combiner lens, a waveguide, a hot mirror, etc.) on or through which a user may view a real-world and/or virtual image. Depending on the type of HMD 200, one or more electronic displays may be associated with the optical elements 204, such as for displaying virtual content or a reproduction of real-world content to the user. Non-limiting examples of the electronic display include a liquid crystal display (LCD), a light emitting diode (LED) display, a microLED display, an organic light emitting diode (OLED) display, an active-matrix OLED display (AMOLED), a transparent OLED display (TOLED), a laser-based display, a liquid crystal on silicon (LCoS) display, a scanning source (e.g., a scanning laser), a waveguide, an image combiner lens, combinations thereof, and/or the like.

The eye-tracking system of the HMD 200 may include one or more light sources 210 (represented in FIG. 2 by triangles) for directing radiation (e.g., infrared or visible radiation) toward the eye(s) of the user and one or more first optical sensors 216 (represented in FIG. 2 by empty squares) for sensing radiation (e.g., infrared or visible radiation) reflected from the user's eye(s). In some embodiments, the eye-tracking system may optionally include one or more second optical sensors 218 (represented in FIG. 2 by hatched squares) that may exhibit a higher resolution than the first optical sensors 216 (e.g., by having an increased quantity of sensing elements and/or smaller sensing elements). The second optical sensors 218, if present, may be used for eye tracking less frequently than the first sensors 216, such as for calibration operations and/or periodically to confirm or adjust an analysis of data from the first sensors 216.

The light sources 210, the first optical sensors 216, and the second optical sensors 218 (if present) may be positioned in a variety of locations on the HMD 200. As shown in FIG. 2, these components may be positioned on or embedded within different locations along the frame 202 and/or on or embedded within the optical element 204 and within an optical aperture of the optical element 204. In some examples, the "optical aperture" of an optical element may refer to a portion of the optical element through which a user is intended to view a real-world or virtual image. If positioned within the optical aperture of the optical element 204, the light sources 210, first optical sensors 216, and second optical sensors 218 (and any conductive material for providing electrical access thereto, e.g., conductive traces) may be formed of a material and/or at a size that is substantially invisible or transparent to visible light when the HMD 200 is in use. For example, the light sources 210, first optical sensors 216, and second optical sensors 218 positioned within the optical aperture may be about 200 μm (in length and/or width) or less, such as about 100 μm or less. Similarly, conductive traces for providing electrical access to these components may have a line width of about 200 μm or less, such as about 100 μm or less.

In some embodiments, multiple light sources 210 may be distributed at different locations on the HMD 200, such as along the frame 202, on or embedded within the optical elements 204, and/or along a temple portion of the frame 202. The light sources 210 may direct radiation (e.g., infrared or visible radiation) directly toward the user's eye or indirectly toward the user's eye, such as by reflecting off or redirecting through the optical elements 204 (e.g., a hot mirror, an image combiner lens, a waveguide, etc.). For example, the light sources 210 may be or include an infrared light-emitting diode ("IRED"). Having multiple light sources 210 may ensure that radiation reaches the user's eye in many different conditions and states, such as when the user's eyelid or eyelashes block radiation from one or more of the light sources 210, when the user looks in different directions, when the user's eye or eyelid anatomy varies, etc.

In some examples, one or more of the light sources 210 may emit modulated radiation, such as radiation having different wavelengths, waveforms, pulsed or durational timing, etc., to enable the eye-tracking system to determine the origin of detected radiation reflected from the user's eye. Such modulated radiation may enable the particular light source 210 of radiation detected by the first or second optical sensors 216, 218 to be determined with increased certainty for improved eye tracking and/or for reducing the effects of ambient radiation (e.g., noise).

Likewise, multiple first optical sensors 216 may be distributed at different locations on the HMD 200, such as along the frame 202 and/or on or embedded within the optical elements 204. The first optical sensors 216 may be located at positions such that at least one of the first optical sensors 216 may have a view of the user's eye at all or substantially all times when the user's eye is open and when the HMD 200 is in use. Examples of suitable optical sensors for the first optical sensors 216 and associated systems and components are described below with reference to FIGS. 3-6B and 8.

The presence of the first optical sensors 216 may improve an efficiency and/or speed of the eye-tracking system of the HMD 200 compared to conventional eye-tracking systems. For example, the relatively low resolution of the first optical sensors 216 may require less power, a smaller physical footprint, less processing resources, and/or less bandwidth than comparably higher resolution optical sensors (e.g., HD cameras, etc.), while still outputting data sufficient to effectively determine a position of the user's eye.

FIG. 3 is a top view of an eye-tracking system 300 positioned with respect to a user's eye 301. The user's eye 301 includes a sclera 302, a pupil 304, and a cornea 306. The eye-tracking system 300 may include an optical element 308, which may be supported by a frame 310.

A first optical sensor 312, which may be configured for detecting radiation in the form of a glint 314 reflected from the user's eye 301 for eye-tracking purposes, may be positioned on or embedded within the optical element 308 and/or the frame 310. The first optical sensor 312 may have a single photosensitive sensing element 316, or may be an array that includes a plurality (as shown in FIG. 3) of photosensitive sensing elements 316. The sensing element(s) 316 may be positioned on or in a substrate 318 (e.g., a semiconductor substrate, a glass substrate, a polymer substrate, a composite substrate, the optical element 308, etc.). In some examples, one or more micro-lenses 320 may be positioned on or over the sensing elements 316 for focusing or defocusing radiation reflected from the user's eye 301 relative to the sensing elements 316. Different portions (e.g., different sensing elements 316) of the optical sensor 312 may have a respective field of view ("FOV") 322, 324 through an associated micro-lens 320. The FOVs 322, 324 may represent a cone or other area within which light reflected from the user's eye 301 may reach the respective portions (e.g., sensing elements 316) of the optical sensor 312. The FOVs 322, 324 of different portions of the first optical sensor 312 may overlap each other (as illustrated in FIG. 2) or may not overlap each other. The diameter of the micro-lens 420 and associated sensor, and any associated packaging, may be less than about 200 μm, such as less than about 100 μm.

A position of the glint 314 on the user's eye 301 may be ascertained by detecting the amount of radiation (e.g., infrared radiation) detected by the various sensing elements 316 of the first optical sensor 312. For example, in an embodiment in which the first optical sensor 312 includes an array of multiple sensing elements 316, if more radiation is detected in a first one of the sensing elements 316 compared to a second one of the sensing elements 316, it may be determined that a greater portion of the glint 314 is within the respective FOV 322 or 324 associated with the first one of the sensing elements 316.

As the user's eye 301 moves (e.g., to look in a different direction), at least a portion of the glint 314 may reflect from different surfaces on the user's eye 301, such as from the sclera 302 to the cornea 306. Because the curvature and surface angle of the cornea 306 is different from the curvature and surface angle of the sclera 302, the radiation of the glint 314 may be detected (or detected more or less) by different portions (e.g., sensing elements 316) of the first optical sensor 312. Such changes may be analyzed by the eye-tracking system 300 to determine a position of the user's eye 301 relative to the optical element 308.

Similar concepts may also be applicable to pupil tracking, as opposed to or in addition to glint tracking. For example, a second optical sensor 332, which may be configured for detecting a position of the pupil 304 of the user's eye 301 for eye-tracking purposes, may be positioned on or embedded within the optical element 308 and/or the frame 310. The second optical sensor 332 may include a single photosensitive sensing element 336 or an array of photosensitive sensing elements 336. The sensing element(s) 336 may be positioned on or in a substrate 338. In some examples, one or more micro-lenses 340 may be positioned on or over the sensing elements 316 for focusing radiation reflected from the user's eye 301 relative to the sensing elements 336. Different portions (e.g., different sensing elements 336) of the second optical sensor 332 may have a respective FOV 342, 344 through an associated micro-lens 320. The FOVs 342, 344 may represent a cone or other area within which light reflected from the user's eye 301 may reach the respective portions (e.g., sensing elements 336) of the second optical sensor 332. The FOVs 342, 344 of different portions (e.g., different sensing elements 336) of the second optical sensor 332 may overlap each other (as illustrated in FIG. 2) or may not overlap each other.

A position of the pupil 304 of the user's eye 301 may be ascertained by detecting the amount of radiation (e.g., infrared radiation) detected by the second optical sensor 332, similar to the procedure described above with reference to the first optical sensor 312. However, rather than correlating a presence and amount of radiation detected by a sensing element 316 to a position of the glint 314, a lack of or reduced amount of reflected radiation detected by the sensing elements 336 of the second optical sensor 332 may be correlated to the presence and location of the pupil 304. For example, light (e.g., infrared radiation, visible light) may readily reflect off the sclera 302 and the iris (not shown) of the user's eye 302, but may not reflect (or may reflect to a lesser degree) from the pupil 304 (in the case of so-called "dark-pupil" eye tracking). Thus, when a first portion (e.g., sensing element 336) detects a reduced amount of radiation compared to a second portion (e.g., another sensing element 336), the eye-tracking system 300 may determine that the pupil 304 (or a greater portion thereof) is positioned within the FOV 342 or 344 associated with the first portion of the second optical sensor 332.

In some embodiments, one or both of the optical sensors 312, 332 may be used to employ edge detection techniques. Edge detection techniques may involve identifying discontinuities or differences in the radiation (e.g., brightness, amount of radiation, etc.) detected at the sensing elements 316, 336 for finding the boundaries of objects (e.g., boundaries associated with pupils and/or glints). In some examples, at least one of the optical sensors 312, 332 may be used in conjunction with a comparator to perform edge detection. A comparator may refer to a device that compares two voltages or currents and outputs a signal indicating which of the two voltages or currents is larger. In some examples, a plurality of comparators may be electronically coupled to one or more sensing elements 316, 336 of the optical sensor 312, 332. The comparators may rank the relative intensities of voltages and/or electrical currents produced by the sensing elements 316, 336 to detect edges (e.g., of the glint 314 and/or of the pupil 304).

The comparator may take a variety of different forms, such as a differential comparator (e.g., a comparator that includes a differential amplifier), an operational amplifier-based comparator, a voltage comparator, and/or the like. The comparator may include a continuous comparator or a clocked comparator, which may be operated in a continuous or a clocked fashion, respectively. A continuous comparator may output a signal (e.g., a high or low signal) as a result of an input, such as a voltage or electrical current difference from the sensing elements 316, 336. The continuous comparator may change its output in near real time to track the state of the input. A clocked comparator (also referred as a latched comparator) may, on the other hand, periodically sample an input and periodically provide corresponding outputs.

In some examples, the comparator may include a digital comparator, which may compare numbers representing two inputs (e.g., voltages or electrical currents from the sensing elements 316, 336) and may determine whether one number is greater than, less than, or equal to the other number. The digital comparator may output which number is larger. In some examples, a plurality of digital comparators may be electronically coupled to the sensing elements 316, 336. The digital comparators may be used to rank the relative intensities of voltages and/or currents detected by the sensing elements 316, 336. This ranking may be performed for determining the relative amount of radiation reaching the individual sensing elements 316, 336, to determine the position of the glint 314 and/or the pupil 304.

The eye-tracking system 300 is illustrated in FIG. 3 as including the first optical sensor 312 for sensing the glint 314 and the second optical sensor 332 for sensing the pupil 304. However, the present disclosure is not limited to eye-tracking systems 300 that include both types of optical sensors 312, 332. Rather, the present disclosure also includes embodiments in which only optical sensors 312 that detect glints 314 are employed, embodiments in which only optical sensors 332 that detect the pupil 304 are employed, or any combination thereof.

In some examples, the substrates 318, 338 of the respective optical sensors 312, 332 may be positioned and/or oriented at predetermined angles to ensure that a sufficient area of potential light reflections may be detected by the optical sensors 312, 332. For example, respective approximate surface normals associated with the substrates 318, 338 may point in parallel directions relative to each other, while the substrates 318, 338 are positioned at a variety of different locations relative to the optical element 308 and/or the frame 310. In another example, the respective approximate surface normals associated with the substrates 318, 338 may point in non-parallel directions in a predetermined pattern with respect to a viewing angle subtended by the eye 301 relative to the optical sensors 312, 332. In this case, the respective optical sensors 312, 332 may be positioned close to each other, and may still be directed at different portions of the user's eye 301 to cover a wide area of potential locations.

As will be further explained below, each of the optical sensors 312, 332 may be relatively low-resolution, and may therefore may include a small number (e.g., from one to about one hundred) respective sensing elements 316, 336 that are relatively large (e.g., at least about 5 µm in both lateral length and lateral width). The low number and large size of the sensing elements 316, 336 may enable the eye-tracking system 300 to operate at low power, high speed, and high efficiency compared to conventional high-resolution optical sensor arrays for eye tracking.

By way of example and not limitation, FIGS. 4A and 4B illustrate respective optical sensors 400A and 400B, which may be implemented as any of the optical sensors previously or later described herein. FIG. 4A illustrates a so-called "quad" or "two-by-two" optical sensor array 400A, referring to the number and layout of sensing elements 402A, 402B, 402C, and 402D (collectively referred to as sensing elements 402) making up the optical sensor array 400A. Similarly, FIG. 4B illustrates a so-called "three-by-three" optical sensor array 400B, which is made up of a grid of nine sensing elements 412. However, the present disclosure is not limited to quad or three-by-three optical sensor arrays. Rather, each low-resolution optical sensor used in eye-tracking may include from one to one hundred (e.g., ten-by-ten) sensing elements, for example. Additionally, the optical sensors may have a layout that is square, rectangular, circular, or another configuration.

The sensing elements 402, 412 may be or include any element that produces an output in response to exposure to radiation. The sensing elements 402, 412 may be sensitive to certain wavelengths of radiation (e.g., infrared radiation, visible radiation, a subset thereof, etc.). By way of example and not limitation, the sensing elements 402, 412 may be or include at least one of: a charge-coupled device ("CCD") sensor, a complementary metal-oxide-semiconductor ("CMOS") sensor, and/or a photodiode sensor.

Referring to FIG. 4A, the quad optical sensor array 400A may include a two-by-two grid of the sensing elements 402. Each of the sensing elements 402 may be square in shape as shown in FIG. 4A, although other shapes (e.g., circular, rectangular, etc.) are also contemplated and included in the present disclosure. Each of the sensing elements 402 may have a lateral length L and a lateral width W. The lateral length L and the lateral width W may each be at least about 5 µm, such as about 10 µm, about 14 µm, about 20 µm, or larger. Conventional sensing elements that may be used in eye-tracking may be substantially smaller, such as having a lateral length and a lateral width of about 2.5 µm or less (e.g., about 1 µm). The relatively larger sensing elements 402 of the present disclosure may enable the collection of more light per sensing element 402, which may reduce a signal-to-noise ratio ("SNR") and may increase light sensitivity compared to conventional sensing elements. In addition, a relatively fewer number of relatively larger sensing elements 402 may increase a computing speed and reduce power for analyzing data from the sensing elements 402.

In FIG. 4A, a projection 404 (e.g., of a glint or of a pupil) may be substantially centered on the optical sensor array 400A. Thus, substantially equal portions of radiation (or lack thereof) corresponding to the projection 404 may be detected by each of the sensing elements 402A, 402B, 402C, and 402D of the optical sensor array 400A. Because of the substantially equal portions of radiation, respective outputs of the sensing elements 402A, 402B, 402C, and 402D may also be substantially equal. Therefore, an eye-tracking system utilizing the optical sensor array 400A may analyze the outputs from the sensing elements 402 to determine that the projection 404 is substantially centered on the optical sensor array 400A and may then correlate the position of the projection 404 to a position of the user's eye.

In some embodiments, the projection 404 may be focused or defocused on the optical sensor array 400A, such that a size of the projection 404 spans at least one of the sensing elements 402. For example, if a glint or other projection 404 does not span at least one of the sensing elements 402, then it may be difficult to determine where within the sensing element 402 the glint or other projection 404 is located. Accordingly, the optics (e.g., the micro-lenses 320, 340 of FIG. 3) may be selected, tailored, or adjusted to focus or defocus the projection 404 for improved accuracy of eye tracking.

Referring to FIG. 4B, the three-by-three optical sensor array 400B may include nine sensing elements 412, including sensing elements 412A, 412B, 412C, and 412D. A projection 414 (e.g., of a glint or of a pupil) may be positioned over respective portions of the sensing elements 412A, 412B, 412C, and 412D. By way of illustration and example, a largest portion of the projection 414 may be positioned over the sensing element 412A and a smallest portion of the projection 414 may be positioned over the sensing element 412D. Substantially equal, intermediate portions of the projection 414 may be positioned over the sensing elements 412B and 412C. The projection 414 may not be positioned over other sensing elements 412 of the optical sensor array 400B. By comparing the amount of light reaching the sensing elements 412A, 412B, 412C, and 412D, and the other sensing elements 412, an eye-tracking system utilizing the optical sensor array 400B may analyze the outputs from the sensing elements 402 to determine the position of the projection 414 and a corresponding position of the user's eye.

In some embodiments, optical sensors of the present disclosure may be or include a position-sensing detector (a "PSD", such as a lateral effect PSD). A PSD may include a single photosensitive sensing element or an array of multiple (e.g., two, four, etc.) sensing elements. In the case of a PSD with a single sensing element, the PSD may also include at least three electrodes. One of the electrodes may serve as a common electrode and the other two electrodes may respectively include a first position-sensing electrode and a second position-sensing electrode at two different locations on the sensing element. Light (e.g., infrared or visible light from a glint reflected off the user's eye) that is absorbed by the single sensing element closer to the first electrode than the second electrode may induce a greater signal (e.g., a change in voltage or current, or both) in the first electrode compared to the second electrode. In additional embodiments, a PSD with a single sensing element may include a common electrode and three or four position-sensing electrodes connected thereto, such as for increased sensitivity and improved accuracy of position determination.

FIG. 5 is a schematic illustration of an optical eye-tracking system 500, which may include a sensing subsystem 502 and an electronics subsystem 504. The sensing subsystem 502 and the electronics subsystem 504 may be in communication with each other, such that a signal output by the sensing subsystem 502 may be analyzed by the electronics subsystem 504 to determine projection location data 506.

The sensing subsystem 502 may include an optical sensor 508 and traces and/or buses 510 configured to transmit an output (e.g., an electrical voltage, an electrical current, a digital signal, an analog signal, etc.) from the optical sensor 508 to the electronics subsystem. The optical sensor 508 is illustrated in FIG. 5 as a four-by-four grid of sensing elements. In additional embodiments, the optical sensor 508 may have other configurations, such as being made up of one to one hundred sensor elements. The optical sensor 508 may be a low-resolution sensor (e.g., being made up of one or more sensor elements being at least about 5 µm in lateral length and in lateral width and/or including about one hundred or fewer sensor elements). The optical sensor 508 may be and function the same as or similar to the optical sensor arrays 400A, 400B discussed above. The traces and/or buses 510 may bias, detect, and/or transmit signals from the sensing element(s) of the optical sensor 508.

The electronics subsystem 504 may include a variety of components for analyzing the signal(s) output by the sensing subsystem 502. In some embodiments, the electronics subsystem 504 may also include components for driving and/or controlling the sensing subsystem 502. By way of example and not limitation, the electronics subsystem 504 may include components such as a clock driver 512, a timing generator 514, an oscillator 516, a bias generator 518, a gain block 520, and an A/D converter 522.

The clock driver 512 may include a synchronous digital circuit, which may provide a clock signal for the sensing subsystem 502 and/or for one or more of the other components of the electronics subsystem 504 (e.g., the timing generator 514). The timing generator 514 may be an electronic circuit that produces a timing signal, which may be used in synchronizing the operation of the sensing subsystem 502 and/or the other components of the electronics subsystem 504.

The oscillator 516 may include an electronic circuit (e.g., a voltage-controlled oscillator) that produces a periodic oscillating electronic signal, such as a signal in the form of a sine wave or a square wave, which may be used by the sensing subsystem 502 and/or the other components of the electronics subsystem 504. The bias generator 518 may include an electronic device that serves to set a direct current ("DC") bias for various circuits and/or components of the sensing subsystem 502 and/or of the electronics subsystem 504 that may be operating on an alternating current ("AC") signal. The bias generator 518 may supply a substantially steady current and/or voltage to various portions of the sensing subsystem 502 and/or electronics subsystem 504.

The gain block 520 may serve to increase the power or amplitude of a signal, such as from the sensing subsystem 502, by adding energy converted from a power supply to the signal. The gain block 520 may increase a sensitivity of the sensing subsystem 502. The A/D converter 522 may include a system that converts an analog signal (e.g., a signal from the sensing subsystem 502) into a digital signal, which may be stored and/or manipulated by the electronics subsystem 504, such as for analysis of the signal.

As shown in FIG. 5, the electronics subsystem 504 and/or a processor associated with the electronics subsystem 504 may analyze a signal output by the sensing subsystem 502 to determine the projection location data 506. For example, by comparing the electrical signals from the various portions (e.g., sensing elements) of the optical sensor 508 when exposed to radiation from a projection 524 (e.g., of a glint or a pupil), the electronics subsystem 504 may determine a projection location 526 and/or a centroid 528 of the projection location 526. This information regarding the projection location 526 and/or the centroid 528 may be used to determine a corresponding position of the user's eye.

FIG. 6A is a schematic illustration of an example optical sensing system 600. FIG. 6B is a plot 602 showing an example voltage output of the optical sensing system 600 of FIG. 6A over time.

Referring to FIG. 6A, the optical sensing system 600 may include a sensing element 604, which may be an event-based or event-driven sensing element 604 that is configured to react to local illumination changes in substantially real time. The sensing element 604 may produce an electrical signal in response to incident radiation 606 and/or in response to a change in the incident radiation 606 (e.g., a change in intensity of the incident radiation 606). An output of the sensing element 604 may be operably coupled to a log block 608, which may be sensitive to the natural logarithm of a current generated and output by the sensing element 604. An output of the log block 608 may be operably coupled to a capacitor 610, which may balance the output of a connected amplifier 612 (e.g., an inverting amplifier) to a preset level. For example, the gain of the amplifier 612 may be determined at least in part by the capacitor 610. A first filter 614 and a second filter 616 may be operably coupled to an output of the amplifier 612. The first filter 614 may be configured to detect an "ON" state of the sensing element 604, and the second filter 616 may be configured to detect an "OFF" state of the sensing element 604. For example, when the signal output by the amplifier 612 increases past a predetermined threshold, an "ON" event may be detected and/or generated by the first filter 614. Conversely, when the signal output by the amplifier decreases past a predetermined threshold, an "OFF" event may be detected and/or generated by the second filter 616.

For example, referring to FIG. 6B, a curve 618 representing voltages in the optical sensing system 600 of FIG. 6A is shown. First data points 620 (represented by parallel hatching in FIG. 6B) correspond to "ON" states of the optical sensing system 600. The first data points 620 are present when the voltage rises by a predetermined amount. Second data points 622 (represented by cross hatching in FIG. 6B) correspond to "OFF" states of the optical sensing system 600. The second data points 622 are present when the voltage falls by a predetermined amount. The "ON" and "OFF" states may be utilized by the optical sensing system 600 for event-driven analysis and processing, which may be more efficient than a similar conventional optical sensing system that may continuously monitor corresponding sensing elements.

FIG. 7 is flow diagram of a method 700 for eye tracking. At operation 702, radiation (e.g., infrared radiation, visible radiation) may be emitted by at least one light source toward an eye of a user. Operation 702 may be performed in a variety of ways. For example, any of the light sources described herein may be used to emit the radiation toward the user's eye.

At operation 704, at least a portion of the radiation reflected off the user's eye may be detected by an optical sensor. Operation 704 may be performed in a variety of ways. For example, the reflected radiation may be detected by any of the optical sensors described herein, such as an optical sensor including at least one sensing element that has a lateral width of at least about 5 µm and a lateral length of a at least about 5 µm. In some examples, at least one characteristic of the optical sensor may ensure that the optical sensor satisfies a predetermined information output constraint (e.g., a bandwidth, an output speed, a power level, an accuracy, any combination thereof, etc.). In some examples, the optical sensor may be positioned within an optical aperture of an optical element of a head-mounted display.

At operation 706, the user's eye may be tracked using data generated by at least the optical sensor. Operation 706 may be performed in a variety of ways. For example, the user's eye may be tracked as described herein.

FIG. 8 is schematic illustration of an example display system (e.g., an HMD) 800, which may be capable of tracking a position of a user's eye 801. The display system 800 may include one or more light sources 802, an optical subsystem 804, an eye-tracking subsystem 806, and/or a control subsystem 808.

The light source(s) 802 may generate light 810 that may be directed toward the user's eye 801 for eye-tracking purposes. For example, the light source(s) 802 may include any device capable of producing such light 810, such as an IRED. The light 810 for eye-tracking may be structured (e.g., having a predetermined pattern, such as a grid or other shape), unstructured (e.g., a field of substantially continuous illumination), or in one or more points (e.g., glints). Reflected light 812 may reflect off the user's eye 801 and may be detected by the eye-tracking subsystem 806. The eye-tracking subsystem 806 may include at least one low-resolution optical sensor, as described above. The eye-tracking subsystem 806 may be configured to determine a position, motion, and gaze distance/angle of the user's eye 801.

In additional embodiments, the light source(s) 802 may produce an image 814 (e.g., video content, artificial-reality content, etc.) displayed to the user's eye 801 by the display system 800. For example, the light source(s) 802 may include a two-dimensional ("2D") projector (e.g., a LCoS display), a scanning source (e.g., a scanning laser), or another electronic display device (e.g., a LCD, an LED display, an OLED display, an active-matrix OLED display (AMOLED), a transparent OLED display (TOLED), or some other display) that is capable of generating light for presenting the image 814 to the user. In some embodiments, the light source 802 may pass the image 814 (e.g., a virtual image) through the optical subsystem 804. The optical subsystem 804 may include, for example, an optical lens configured to cause light containing the image 814 to converge at or near a pupil 816 of the user's eye 801. In some examples, the optical subsystem 804 may include any number of lenses (e.g., Fresnel lenses, convex lenses, concave lenses), apertures, filters, mirrors, prisms, and/or other optical components, possibly in combination with actuators and/or other devices. For example, the actuators and/or other devices may translate and/or rotate one or more of the optical components to alter one or more aspects of the image 814. Further, various mechanical couplings may serve to maintain the relative spacing and/or the orientation of the optical components in any suitable combination.

The control subsystem 808 may include one or more processors, which may be configured to control one or more of the light source(s) 802, the optical subsystem 804, and/or the eye-tracking subsystem 806. In some examples, the control subsystem 808 may control the light source(s) 802 and/or the optical subsystem 804 based on data from the eye-tracking subsystem 806. Additionally, in some examples, the control subsystem 808 may store and utilize historical tracking information (e.g., a history of the tracking information over a given duration, such as the previous second or fraction thereof) to anticipate the gaze angle of the eye 801 (e.g., an angle between a visual axis and an anatomical axis of the eye 801). In some embodiments, the eye-tracking subsystem 806 may detect radiation emanating from some portion of the eye 801 (e.g., the cornea, the iris, the pupil, or the like) to determine the current gaze angle of the eye 801. In other examples, the eye-tracking subsystem 806 may employ a wavefront sensor to track the current location of the pupil.

Any number of techniques can be used to track the eye 801. Some techniques may involve illuminating the eye 801 with infrared light (e.g., from the light source(s) 802) and measuring reflections with at least one optical sensor (e.g., of the eye-tracking subsystem 806) that is tuned to be sensitive to the infrared light. Information about how the infrared light is reflected from the eye 801 may be analyzed to determine the position(s), orientation(s), and/or motion(s) of one or more eye feature(s), such as the cornea, pupil, iris, and/or retinal blood vessels. In some examples, the radiation captured by a sensing element of the eye-tracking subsystem 806 may be digitized (i.e., converted to an electronic signal). Further, the sensing element may transmit a digital representation of this electronic signal to one or more processors (for example, processors associated with a device including the eye-tracking subsystem 806).

In some examples, one or more processors may process the digital representation generated by the sensing element(s) of the eye-tracking subsystem 806 to track the movement of the eye 801. In another example, these processors may track the movements of the eye 801 by executing algorithms represented by computer instructions stored on non-transient memory. In some examples, on-chip logic (e.g., an application-specific integrated circuit, ASIC) may be used to perform at least portions of such algorithms.

As noted, the eye-tracking subsystem 806 may be programmed to use an output of the sensing element(s) to track movement of the eye 801. In some embodiments, the eye-tracking subsystem 806 may analyze the digital representation generated by the sensors to extract eye rotation information from changes in reflections. In one embodiment, the eye-tracking subsystem 806 may use corneal reflections or glints and/or the center of the eye's pupil 816 as features to track over time, as discussed above with reference to FIG. 3.

In some embodiments, the eye-tracking subsystem 806 may use two types of infrared and/or near-infrared (also known as active light) eye-tracking techniques: bright-pupil and dark-pupil eye tracking, which may be differentiated based on the location of the light source(s) 802 with respect to the optical elements used. If the illumination is coaxial with the optical path, then the eye 801 may act as a retroreflector as the incident light 810 reflects off the retina, thereby creating a bright pupil effect similar to a red eye effect in photography. If the light source(s) 802 is/are offset from the optical path, then the pupil 816 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, the control subsystem 808 may control the light source(s) 802 and/or the optical subsystem 804 to reduce optical aberrations (e.g., chromatic aberrations and/or monochromatic aberrations) of the image 814 that may be caused by or influenced by the eye 801 of the viewer. In some examples, as mentioned above, the control subsystem 808 may use the tracking information from eye-tracking subsystem 806 to perform such controls. For example, in controlling the light source(s) 802, the control subsystem 808 may alter the light generated by the light source(s) 802 (e.g., by way of image rendering) to modify (e.g., pre-distort) the image 814 so that the aberration of the image 814 caused by eye 801 may be reduced or eliminated.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as contact lenses worn by the user. In some embodiments, ophthalmic correction elements (e.g., adjustable lenses) may be directly incorporated into the display system (e.g., HMD). In some examples, the eye-tracking algorithm(s) may be modified based on the color of the user's eye. For example, eye-tracking algorithm(s) may be modified based at least in part on the differing color contrast between a brown eye and, for example, a blue eye.

Embodiments of the present disclosure may complement and enhance a user's navigation and exploration in an artificial-reality environment. As noted, the disclosed systems may facilitate relatively lower power usage and/or a faster processing time as compared with conventional eye-tracking systems. This may be due to the use of low-resolution (e.g., information-efficient) optical sensors. Additionally, the disclosed systems may enable eye-tracking systems having a relatively lower weight and/or a smaller form factor with respect to conventional eye-tracking systems. Further, the disclosed systems may enable eye tracking with a relatively non-obstructive field of view. For example, the disclosed systems may use relatively smaller optical sensors and/or smaller light sources, which may be disposed within an optical aperture of an HMD.

As noted, the disclosed systems may use various AI-based algorithms and techniques for carrying out the various embodiments and/or examples disclosed herein. These AI-based algorithms and techniques may provide for or aid in the numerous determinations (e.g., to determine, identify, ascertain, infer, calculate, predict, prognose, estimate, derive, forecast, detect, compute, etc.) described herein. For example, the components described herein can examine the entirety or a subset of the data to which it is granted access and can provide reasoning about or determine states of the system, environment, etc. from a set of observations, as captured via events and/or data. Determinations can be employed to identify a specific context or action to generate, for example, a probability distribution over states. In one example, these determinations may be probabilistic; that is, they may involve the computation of a probability distribution over states of interest based on a consideration of data and events. These determinations can also refer to techniques employed for composing higher-level events from a set of events and/or data.

Such determinations can result in the construction of new events or actions from a set of observed events and/or stored event data, whether the events are correlated in close temporal proximity and/or whether the events and data originate from one or several event and/or data sources (e.g., different sensor inputs). The systems and components disclosed herein may also employ various classifications, both explicitly trained (e.g., via training data) and implicitly trained (e.g., via observing behavior, preferences, historical information, receiving extrinsic information, etc.), schemes, and/or systems (e.g., support vector machines, neural networks, expert systems, Bayesian belief networks, fuzzy logic, data fusion engines, etc.) when performing the automatic and/or determined actions disclosed herein. As such, the disclosed systems may use classification schemes and/or systems to automatically learn and/or perform a variety of functions, actions, and/or determinations For example, a classifier may map an input attribute vector, $z=(z1, z2, z3, z4, zn)$ to a confidence that the input belongs to a class, as represented by $f(z)=confidence(class)$. Such classifications can employ a probabilistic and/or statistical-based analysis (e.g., factoring into the analysis utilities and costs) to determinate an action to be automatically performed. A support vector machine (SVM) is one example of such a classifier. This SVM may operate by finding a hyper-surface in the space of possible inputs, where the hyper-surface attempts to split the triggering criteria from the non-triggering events. This may make the classification correct for testing data that is near, but not identical to training data. Other directed and undirected model classification approaches include, for example, naïve Bayes and Bayesian networks, decision trees, neural networks, fuzzy logic models, and/or probabilistic classification models providing different patterns of independence.

As detailed above, embodiments of the present disclosure may include or be implemented in conjunction a cloud-computing system. Cloud computing can refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud-computing environment may include one or more cloud computing nodes with which local computing devices used by cloud consumers (such as personal digital assistants or cellular phones, desktop or laptop computers, and/or automobile computer systems) can communicate. In a cloud-computing system, nodes can communicate with one another. They can be grouped physically or virtually, in one or more networks, such as private, community, public, or hybrid clouds. This allows cloud-computing environment to offer infrastructure, platforms, and/or software as services for which a cloud consumer does not need to maintain resources on a local computing device. In some examples, a cloud-computing system can communicate with any type of computerized device over any type of network and/or network-addressable connection (using, e.g., a web browser).

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 900 in FIG. 9. Other artificial-reality systems may include an NED that also provides visibility into the real world (e.g., augmented-reality system 1000 in FIG. 10) or that visually immerses a user in an artificial reality (e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 9, the augmented-reality system 900 generally represents a wearable device dimensioned to fit about a body part (e.g., a head) of a user. As shown in FIG. 9, system 900 may include a frame 902 and a camera assembly 904 that is coupled to frame 902 and configured to gather information about a local environment by observing the local environment. The augmented-reality system 900 may also include one or more audio devices, such as output audio transducers 908(A) and 908(B) and input audio transducers 910. The output audio transducers 908(A) and 908(B) may provide audio feedback and/or content to a user, and the input audio transducers 910 may capture audio in a user's environment.

As shown, the augmented-reality system 900 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the augmented-reality system 900 may not include an NED, the augmented-reality system 900 may include other types of screens or visual feedback devices (e.g., a display screen integrated into a side of the frame 902).

The embodiments discussed in this disclosure may also be implemented in augmented-reality systems that include one or more NEDs. For example, as shown in FIG. 10, the augmented-reality system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the augmented-reality system 1000 includes two displays, embodiments of this disclosure may be implemented in augmented-reality systems with a single NED or more than two NEDs.

In some embodiments, the augmented-reality system 1000 may include one or more sensors, such as a sensor 1040. The sensor 1040 may generate measurement signals in response to motion of the augmented-reality system 1000 and may be located on substantially any portion of the frame 1010. The sensor 1040 may represent a position sensor, an inertial measurement unit (IMU), a depth camera assembly, or any combination thereof. In some embodiments, the augmented-reality system 1000 may or may not include the sensor 1040 or may include more than one sensor. In embodiments in which the sensor 1040 includes an IMU, the IMU may generate calibration data based on measurement signals from the sensor 1040. Examples of the sensor 1040 may include, without limitation, accelerometers, gyroscopes, magnetometers, other suitable types of sensors that detect motion, sensors used for error correction of the IMU, or some combination thereof.

The augmented-reality system 1000 may also include a microphone array with a plurality of acoustic transducers 1020(A)-1020(J), referred to collectively as acoustic transducers 1020. The acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 2 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of the acoustic transducers 1020(A)-(F) may be used as output transducers (e.g., speakers). For example, the acoustic transducers 1020(A) and/or 1020(B) may be earbuds or any other suitable type of headphone or speaker.

The configuration of the acoustic transducers 1020 of the microphone array may vary. While the augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of the acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on the frame 1010, an orientation associated with each acoustic transducer 1020, or some combination thereof.

The acoustic transducers 1020(A) and 1020(B) may be positioned on different parts of the user's ear, such as behind the pinna or within the auricle or fossa. Or, there may be additional acoustic transducers on or surrounding the ear in addition to the acoustic transducers 1020 inside the ear canal. Having an acoustic transducer 1020 positioned next to an ear canal of a user may enable the microphone array to collect information on how sounds arrive at the ear canal. By positioning at least two of the acoustic transducers 1020 on either side of a user's head (e.g., as binaural microphones), the augmented-reality device 1000 may simulate binaural hearing and capture a 3D stereo sound field around about a user's head. In some embodiments, the acoustic transducers 1020(A) and 1020(B) may be connected to the augmented-reality system 1000 via a wired connection 1030, and in other embodiments, the acoustic transducers 1020(A) and 1020(B) may be connected to the augmented-reality system 1000 via a wireless connection (e.g., a Bluetooth connection). In still other embodiments, the acoustic transducers 1020(A) and 1020(B) may not be used at all in conjunction with the augmented-reality system 1000.

The acoustic transducers 1020 on the frame 1010 may be positioned along the length of the temples, across the bridge, above or below the display devices 1015(A) and 1015(B), or some combination thereof. The acoustic transducers 1020 may be oriented such that the microphone array is able to detect sounds in a wide range of directions surrounding the user wearing the augmented-reality system 1000. In some embodiments, an optimization process may be performed during manufacturing of the augmented-reality system 1000 to determine relative positioning of each acoustic transducer 1020 in the microphone array.

In some examples, the augmented-reality system 1000 may include or be connected to an external device (e.g., a paired device), such as the neckband 1005. The neckband 1005 generally represents any type or form of paired device. Thus, the following discussion of the neckband 1005 may also apply to various other paired devices, such as charging cases, smart watches, smart phones, wrist bands, other wearable devices, hand-held controllers, tablet computers, laptop computers and other external compute devices, etc.

As shown, the neckband 1005 may be coupled to the eyewear device 1002 via one or more connectors. The connectors may be wired or wireless and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and the neckband 1005, the components may be located elsewhere and/or distributed differently on the eyewear device 1002 and/or the neckband 1005. In some embodiments, the components of the eyewear device 1002 and the neckband 1005 may be located on one or more additional peripheral devices paired with the eyewear device 1002, the neckband 1005, or some combination thereof.

Pairing external devices, such as the neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 since users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a stand-alone eyewear device. Since weight carried in the neckband 1005 may be less invasive to a user than weight carried in the eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1005 may be communicatively coupled with the eyewear device 1002 and/or to other devices. These other devices may provide certain functions (e.g., tracking, localizing, depth mapping, processing, storage, etc.) to the augmented-reality system 1000. In the embodiment of FIG. 10, the neckband 1005 may include two acoustic transducers (e.g., 1020(I) and 1020(J)) that are part of the microphone array (or potentially form their own microphone subarray). The neckband 1005 may also include a controller 1025 and a power source 1035.

The acoustic transducers 1020(I) and 1020(J) of the neckband 1005 may be configured to detect sound and convert the detected sound into an electronic format (analog or digital). In the embodiment of FIG. 10, the acoustic transducers 1020(I) and 1020(J) may be positioned on the neckband 1005, thereby increasing the distance between the neckband acoustic transducers 1020(I) and 1020(J) and other acoustic transducers 1020 positioned on the eyewear device 1002. In some cases, increasing the distance between the acoustic transducers 1020 of the microphone array may improve the accuracy of beamforming performed via the microphone array. For example, if a sound is detected by the acoustic transducers 1020(C) and 1020(D) and the distance between the acoustic transducers 1020(C) and 1020(D) is greater than, e.g., the distance between the acoustic transducers 1020(D) and 1020(E), the determined source location of the detected sound may be more accurate than if the sound had been detected by the acoustic transducers 1020(D) and 1020(E).

The controller 1025 of the neckband 1005 may process information generated by the sensors on the neckband 1005 and/or the augmented-reality system 1000. For example, the controller 1025 may process information from the microphone array that describes sounds detected by the microphone array. For each detected sound, the controller 1025 may perform a direction-of-arrival (DOA) estimation to estimate a direction from which the detected sound arrived at the microphone array. As the microphone array detects sounds, the controller 1025 may populate an audio data set with the information. In embodiments in which the augmented-reality system 1000 includes an IMU, the controller 1025 may compute all inertial and spatial calculations from the IMU located on the eyewear device 1002. A connector may convey information between the augmented-reality system 1000 and the neckband 1005 and between the augmented-reality system 1000 and the controller 1025. The information may be in the form of optical data, electrical data, wireless data, or any other transmittable data form. Moving the processing of information generated by the augmented-reality system 1000 to the neckband 1005 may reduce weight and heat in the eyewear device 1002, making it more comfortable to the user.

The power source 1035 in the neckband 1005 may provide power to the eyewear device 1002 and/or to the neckband 1005. The power source 1035 may include, without limitation, lithium ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 1100 in FIG. 11, that mostly or completely covers a user's field of view. The virtual-reality system 1100 may include a front rigid body 1102 and a band 1104 shaped to fit around a user's head. The virtual-reality system 1100 may also include output audio transducers 1106(A) and 1106(B). Furthermore, while not shown in FIG. 11, the front rigid body 1102 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1000 and/or the virtual-reality system 1100 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 1000 and/or the virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image-projection system.

Artificial-reality systems may also include various types of computer vision components and subsystems. For example, the augmented-reality system 900, augmented-reality system 1000, and/or virtual-reality system 1100 may include one or more optical sensors, such as 2D or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 9 and 11, the output audio transducers 908(A), 908(B), 1106(A), and 1106(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 910 may include condenser microphones, dynamic microphones, ribbon microphones, and/or any other type or form of input transducer. In some embodiments, a single transducer may be used for both audio input and audio output.

While not shown in FIGS. 9-11, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

By way of example and not limitation, some embodiments of the present disclosure include the following:

Example 1

An eye-tracking system, including: at least one light source configured to emit radiation toward a location intended for an eye of a user; and at least one optical sensor including at least one sensing element configured to detect at least a portion of the radiation emitted by the at least one light source, wherein: the at least one sensing element has a lateral width of at least about 5 μm and a lateral length of at least about 5 μm, and the eye-tracking system is configured to track the user's eye using data generated by at least the optical sensor.

Example 2

The eye-tracking system of Example 1, wherein the at least one optical sensor includes an array of between two and one hundred sensing elements.

Example 3

The eye-tracking system of Example 1 or Example 2, at least one characteristic of the optical sensor ensures that the optical sensor satisfies a predetermined information output constraint.

Example 4

The eye-tracking system of any of Examples 1 through 3, wherein the optical sensor has a lateral width of about 500 μm or less and a lateral length of about 500 μm or less.

Example 5

The eye-tracking system of any of Examples 1 through 4, wherein the optical sensor has a lateral width of about 100 μm or less and a lateral length of about 100 μm or less.

Example 6

The eye-tracking system of any of Examples 1 through 5, wherein the radiation emitted by the light source includes at least one of infrared radiation or visible light.

Example 7

The eye-tracking system of any of Examples 1 through 6, further including a differential comparator configured to perform edge detection based on the data generated by at least the optical sensor.

Example 8

The eye-tracking system of any of Examples 1 through 7, wherein the eye-tracking system is configured to track the user's eye by tracking, based on an analysis of the data generated by at least the optical sensor, at least one of: a pupil of the user's eye; or a glint projected onto the user's eye.

Example 9

A head-mounted display, including: a near-eye display (NED) configured to be worn by a user; at least one light source configured to emit radiation toward a location intended for an eye of a user; and at least one optical sensor including at least one sensing element configured to detect at least a portion of the radiation emitted by the at least one light source, wherein: the at least one sensing element has a lateral width of at least about 5 μm and a lateral length of at least about 5 μm, and the eye-tracking system is configured to track the user's eye using data generated by at least the optical sensor.

Example 10

The head-mounted display of Example 9, further including an optical element including an optical aperture through which the user views an image from the near-eye display when the eye-tracking system is in use.

Example 11

The head-mounted display of Example 10, wherein the optical sensor is disposed within the optical aperture of the optical element.

Example 12

The head-mounted display of Example 10 or Example 11, wherein the optical sensor includes two or more optical sensors.

Example 13

The head-mounted display of Example 12, wherein each optical sensor of the two or more optical sensors is disposed on or in a frame that supports the optical element and the near-eye display.

Example 14

The head-mounted display of Example 12 or Example 13, wherein the two or more optical sensors includes a first optical sensor positioned at least partially within the optical aperture of the optical element and a second optical sensor disposed on or in a frame that supports the optical element and the near-eye display.

Example 15

The head-mounted display of any of Examples 12 through 14, wherein respective approximate surface normals associated with substrates of each optical sensor point in parallel directions or point in non-parallel directions in a predetermined pattern with respect to a viewing angle subtended by the user's eye relative to the optical sensors, when the head-mounted display is donned by the user.

Example 16

The head-mounted display of any of Examples 10 through 15, wherein the light source is disposed within the optical aperture of the optical element.

Example 17

The head-mounted display of any of Examples 10 through 16, wherein the light source is disposed on or in a frame that supports the optical element and the near-eye display.

Example 18

The head-mounted display of Example 17, wherein the radiation from the light source is directed to the location intended for the user's eye via at least one of: a reflection from a hot mirror; a reflection from the optical element; or a waveguide.

Example 19

The head-mounted display of any of Examples 10 through 18, wherein the at least one light source includes a plurality of light sources positioned at different locations relative to the optical element.

Example 20

A method for eye tracking, including: emitting, by at least one light source, radiation toward an eye of a user; detecting, by an optical sensor comprising at least one sensing element having a lateral width of at least about 5 μm and a lateral length of at least about 5 μm, at least a portion of the radiation reflected off the user's eye; and tracking the user's eye using data generated by at least the optical sensor.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An eye-tracking system, comprising:
    at least one light source configured to emit radiation toward a location intended for an eye of a user; and
    at least one optical sensor comprising at least one sensing element configured to detect at least a portion of the radiation emitted by the at least one light source, wherein:
        the at least one sensing element has a lateral width of at least about 5 µm and a lateral length of at least about 5 µm, and
        the eye-tracking system is configured to track the user's eye using data generated by at least the optical sensor.

2. The eye-tracking system of claim 1, wherein the at least one optical sensor comprises an array of between two and one hundred sensing elements.

3. The eye-tracking system of claim 1, wherein at least one characteristic of the optical sensor ensures that the optical sensor satisfies a predetermined information output constraint.

4. The eye-tracking system of claim 1, wherein the optical sensor has a lateral width of about 500 µm or less and a lateral length of about 500 µm or less.

5. The eye-tracking system of claim 1, wherein the optical sensor has a lateral width of about 100 µm or less and a lateral length of about 100 µm or less.

6. The eye-tracking system of claim 1, wherein the radiation emitted by the light source comprises at least one of infrared radiation or visible light.

7. The eye-tracking system of claim 1, further comprising a differential comparator configured to perform edge detection based on the data generated by at least the optical sensor.

8. The eye-tracking system of claim 1, wherein the eye-tracking system is configured to track the user's eye by tracking, based on an analysis of the data generated by at least the optical sensor, at least one of:
    a pupil of the user's eye; or
    a glint projected onto the user's eye.

9. A head-mounted display, comprising:
    a near-eye display configured to be worn by a user;
    at least one light source configured to emit radiation toward a location intended for an eye of a user; and
    at least one optical sensor comprising at least one sensing element configured to detect at least a portion of the radiation emitted by the at least one light source, wherein:
        the at least one sensing element has a lateral width of at least about 5 µm and a lateral length of at least about 5 µm, and
        the eye-tracking system is configured to track the user's eye using data generated by at least the optical sensor.

10. The head-mounted display of claim 9, further comprising an optical element comprising an optical aperture through which the user views an image from the near-eye display when the eye-tracking system is in use.

11. The head-mounted display of claim 10, wherein the optical sensor is disposed within the optical aperture of the optical element.

12. The head-mounted display of claim 10, wherein the optical sensor comprises two or more optical sensors.

13. The head-mounted display of claim 12, wherein each optical sensor of the two or more optical sensors is disposed on or in a frame that supports the optical element and the near-eye display.

14. The head-mounted display of claim 12, wherein the two or more optical sensors comprise a first optical sensor positioned at least partially within the optical aperture of the optical element and a second optical sensor disposed on or in a frame that supports the optical element and the near-eye display.

15. The head-mounted display of claim 12, wherein respective approximate surface normals associated with substrates of each optical sensor point in parallel directions or point in non-parallel directions in a predetermined pattern with respect to a viewing angle subtended by the user's eye relative to the optical sensors, when the head-mounted display is donned by the user.

16. The head-mounted display of claim 10, wherein the light source is disposed within the optical aperture of the optical element.

17. The head-mounted display of claim 10, wherein the light source is disposed on or in a frame that supports the optical element and the near-eye display.

18. The head-mounted display of claim 17, wherein the radiation from the light source is directed to the location intended for the user's eye via at least one of:
    a reflection from a hot mirror;
    a reflection from the optical element; or
    a waveguide.

19. The head-mounted display of claim 10, wherein the at least one light source comprises a plurality of light sources positioned at different locations relative to the optical element.

20. A method for eye tracking, comprising:
    emitting, by at least one light source, radiation toward an eye of a user;
    detecting, by an optical sensor comprising at least one sensing element having a lateral width of at least about 5 µm and a lateral length of at least about 5 µm, at least a portion of the radiation reflected off the user's eye; and
    tracking the user's eye using data generated by at least the optical sensor.

* * * * *